2408X
*NO PRINTED SPECIFICATION AVAILABLE*
A. GREELY.
FOOT STOVE.
Patented Dec. 23, 1815.
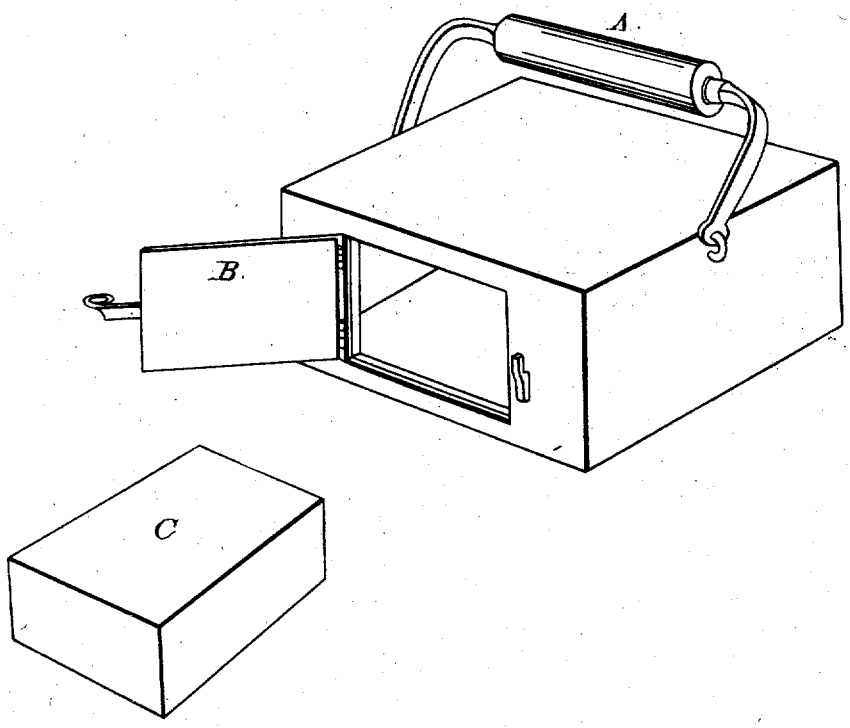

Allen Greely
Letters Patent

The Schedule referred to in these Letters Patent and making part of the same containing a description in the words of the said Allen Greely himself of his improvement in the foot Stove.

The Stove consists principally of the following parts. a bail or handle. an outside case of wood. an inside case or lining of sheet iron. and heater being either a block of free Stone, a tile or two brick bats, & a door on one side lined with sheet iron —
The Stove to be made generally not far from nine inches square, and three inches or thereabouts and a half high, the outside case and the inside lining to be fastened together, the heater after being heated to be placed within the lining, the door either to shove or to open and shut with hinges, the handle or bail to extend from one side to the other of the Stove.

Witnesses
Daniel Cary
Luther Cary

Allen Greely

Exd. 1846.

(174 words)

(Patented 23d. December 1815)